United States Patent
Nakagawa et al.

(10) Patent No.: US 7,788,903 B2
(45) Date of Patent: Sep. 7, 2010

(54) AIR-FUEL RATIO CONTROL APPARATUS OF INTERNAL COMBUSTION ENGINE

(75) Inventors: Norihisa Nakagawa, Numadu (JP); Asuka Akiyoshi, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1133 days.

(21) Appl. No.: 10/581,189

(22) PCT Filed: Nov. 29, 2004

(86) PCT No.: PCT/JP2004/018081
§ 371 (c)(1),
(2), (4) Date: Jun. 1, 2006

(87) PCT Pub. No.: WO2005/054651
PCT Pub. Date: Jun. 16, 2005

(65) Prior Publication Data
US 2007/0125347 A1    Jun. 7, 2007

(30) Foreign Application Priority Data
Dec. 2, 2003    (JP) ............................ 2003-403078

(51) Int. Cl.
F01N 3/00    (2006.01)
(52) U.S. Cl. .............................. 60/285; 60/277; 60/284; 60/286; 60/301; 123/672
(58) Field of Classification Search .................. 60/277, 60/284, 286, 301, 285; 123/672
See application file for complete search history.

(56) References Cited

U.S. PATENT DOCUMENTS 4,454,846 A     6/1984   Suzuki et al.
5,784,880 A     7/1998   Toshiro et al.
6,539,707 B2 *  4/2003   Ikemoto et al. ............... 60/285
6,619,277 B2 *  9/2003   Katoh ........................ 123/672

(Continued)

FOREIGN PATENT DOCUMENTS

JP     A 59-173533     10/1984

(Continued)

*Primary Examiner*—Thomas E Denion
*Assistant Examiner*—Jesse Bogue
(74) *Attorney, Agent, or Firm*—Oliff & Berridge, PLC

(57) ABSTRACT

An air-fuel ratio control apparatus of an internal combustion engine includes first and second catalysts 10 and 12, first air-fuel ratio acquiring means 8 provided up-stream of the first catalyst, for acquiring an air-fuel ratio of exhaust gas; second air-fuel ratio acquiring means 11 for acquiring an air-fuel ratio of the exhaust gas flowing into the second catalyst, and air-fuel ratio controlling means 13 for controlling an air-fuel ratio according to the air-fuel ratios acquired by the first and second air-fuel ratio acquiring means, and the air-fuel ratio controlling means is provided with lean control means 13 for controlling an air-fuel ratio until the second catalyst becomes lean after completion of a fuel quantity increasing operation of the engine, and intermediate lean control means 13 for performing control to change the air-fuel ratio to a lean air-fuel ratio within the range enough to make the first catalyst lean and not enough to make the second catalyst lean, between the fuel quantity increasing operation and the air-fuel ratio control by the lean control means.

8 Claims, 8 Drawing Sheets

U.S. PATENT DOCUMENTS

| | | | |
|---|---|---|---|
| 6,751,950 B2 * | 6/2004 | Ikemoto et al. | 60/285 |
| 6,915,628 B2 * | 7/2005 | Kamoto et al. | 60/277 |
| 7,165,389 B2 * | 1/2007 | Kamoto et al. | 60/274 |
| 2002/0116919 A1 | 8/2002 | Rosel et al. | |

FOREIGN PATENT DOCUMENTS

| | | |
|---|---|---|
| JP | A 61-087935 | 5/1986 |
| JP | A 63-117139 | 5/1988 |
| JP | A 63-134835 | 6/1988 |
| JP | A 6-249028 | 9/1994 |
| JP | A 6-307271 | 11/1994 |
| JP | A 9-303182 | 11/1997 |
| JP | A 2003-49681 | 2/2003 |
| JP | A 2003-148202 | 5/2003 |
| WO | WO 02/18034 A1 | 3/2002 |

\* cited by examiner

FIG.7
(a)
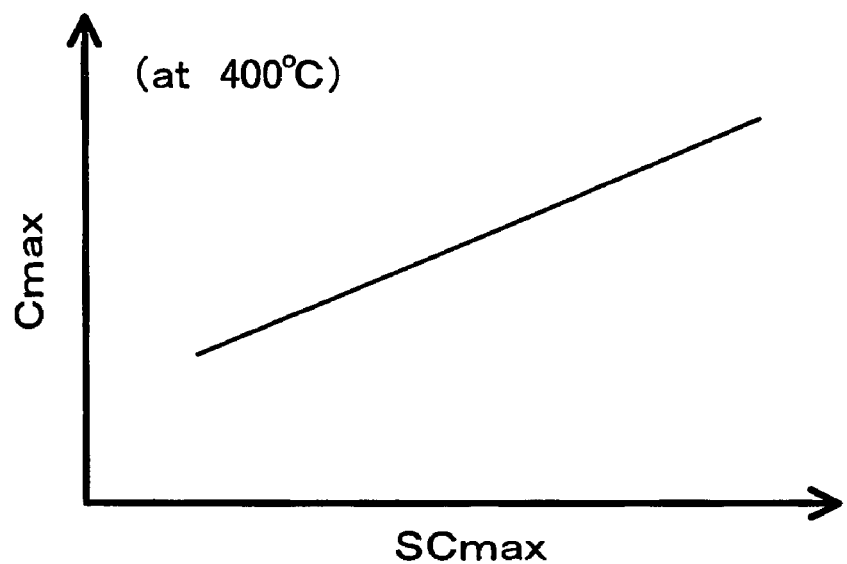
(b)
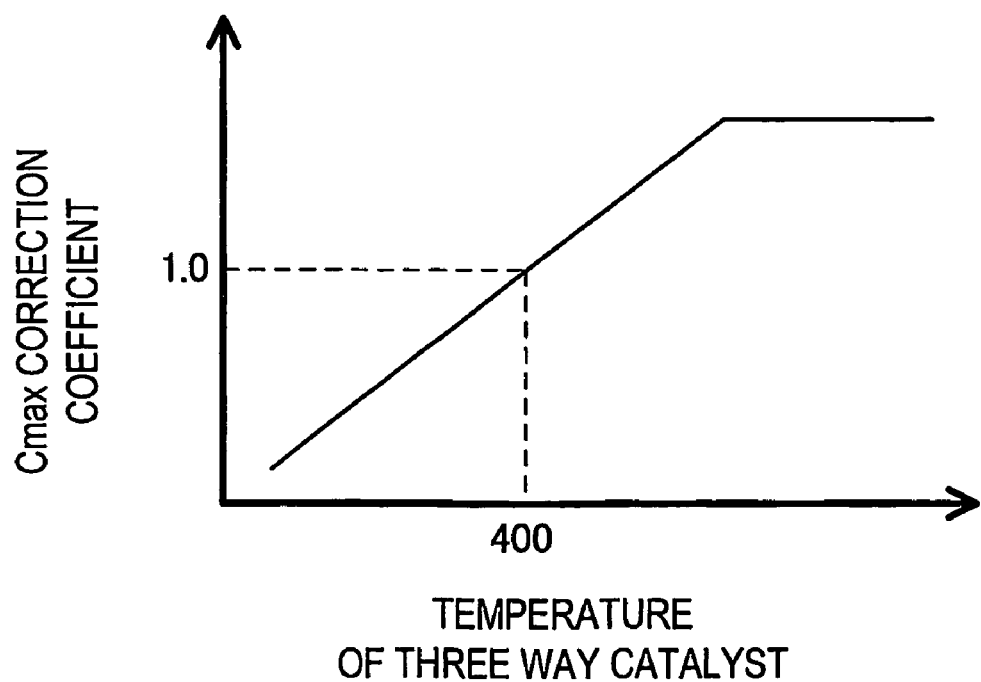

AIR-FUEL RATIO CONTROL APPARATUS OF INTERNAL COMBUSTION ENGINE

TECHNICAL FIELD

The present invention relates to an air-fuel ratio control apparatus of an internal combustion engine provided with an exhaust gas purifying catalyst in an exhaust passage.

BACKGROUND ART

There has been conventionally known an air-fuel ratio control apparatus of an internal combustion engine when an output from an oxygen concentration sensor, which is disposed downstream of a catalyst converter, indicates rich and fuel is increased in quantity in the internal combustion engine, an air-fuel ratio is controlled to be a lean air-fuel ratio for a predetermined period of time, and thereafter, the air-fuel ratio is controlled to be returned to a theoretical air-fuel ratio (see Japanese Patent Application Laid-Open (JP-A) No. 63-117139). In addition, the prior art relating to the present invention is disclosed in JP-A Nos. 63-134835, 6-307271, 59-173533 or 2003-148202.

The capacity of a catalyst in an exhaust gas purifying system mounted on a vehicle or the like has been increased in order to cope with the reinforcement of an exhaust emission control. Therefore, there is a possibility that a conventional air-fuel ratio control cannot suppress generation of a catalyst exhaust gas odor (specifically, an odor of hydrogen sulfide ($H_2S$)), because a quantity of oxygen occluded in an exhaust gas catalyst is small till deceleration or stoppage of the vehicle after the internal combustion engine is operated in an increased quantity of fuel. In order to occlude the oxygen in quantity enough to suppress the generation of the catalyst exhaust gas odor with respect to the catalyst till the deceleration or stoppage of the internal combustion engine, for example, the air-fuel ratio is largely changed onto a lean side by cutting the fuel or the internal combustion engine is operated in a lean air-fuel ratio for a long period of time. However, there may be a problem of a misfire in the internal combustion engine in the case that the air-fuel ratio is largely changed onto the lean side, while there may be a problem of degradation of exhaust emission due to an increase in $NO_x$ generation quantity during operation in a lean air-fuel ratio for a long period of time. Additionally, the degradation of the catalyst is prompted in the atmosphere in which the oxygen is excessively present at a high temperature.

DISCLOSURE OF THE INVENTION

In view of the above-described problem experienced in the prior art, an object of the present invention is to provide an air-fuel ratio control apparatus of an internal combustion engine, in which oxygen in quantity required for preventing any generation of a catalyst exhaust gas odor till the deceleration or stoppage of the internal combustion engine can be securely occluded in an exhaust gas purifying catalyst without degradation of operating state or exhaust emission of the internal combustion engine.

An air-fuel ratio control apparatus of an internal combustion engine according to the present invention includes: a first exhaust gas purifying catalyst disposed in an exhaust passage; a second exhaust gas purifying catalyst disposed downstream of the first exhaust gas purifying catalyst; first air-fuel ratio acquiring means provided upstream of the first exhaust gas purifying catalyst, for acquiring an air-fuel ratio of exhaust gas; second air-fuel ratio acquiring means for acquiring an air-fuel ratio of exhaust gas flowing into the second exhaust gas purifying catalyst; and air-fuel ratio controlling means for controlling an air-fuel ratio in the internal combustion engine according to the air-fuel ratio acquired by the first air-fuel ratio acquiring means and the air-fuel ratio acquired by the second air-fuel ratio acquiring means, wherein the air-fuel ratio controlling means includes: lean control means for controlling an air-fuel ratio in the internal combustion engine until the second exhaust gas purifying catalyst becomes lean after completion of a fuel quantity increasing operation of the internal combustion engine; and intermediate lean control means for performing, at least one time, control to change the air-fuel ratio in the internal combustion engine to a lean air-fuel ratio within the range enough to make the first exhaust gas purifying catalyst lean and not enough to make the second exhaust gas purifying catalyst lean, thus solving the above-described problem between the fuel quantity increasing operation and the air-fuel ratio control by the lean control means.

According to the air-fuel ratio control apparatus of the present invention, the first exhaust gas purifying catalyst is turned to the lean state under the air-fuel ratio control by the intermediate lean control means after the fuel quantity increasing operation of the internal combustion engine (that is, the state in which the catalytic atmosphere becomes lean by occluding a sufficient quantity of oxygen in the catalyst), so that substantially only the second exhaust gas purifying catalyst is turned to the lean state under the air-fuel ratio control by the lean control means. Consequently, it is possible to securely turn the first and second exhaust gas purifying catalysts to the lean state under the air-fuel ratio control by the lean control means. Moreover, the air-fuel ratio is changed to a lean side within the range enough to turn the first exhaust gas purifying catalyst to the lean state and not enough to turn the second exhaust gas purifying catalyst to the lean state under the air-fuel ratio control by the intermediate lean control means, thereby suppressing the degradation of the operating state or the exhaust emission of the internal combustion engine.

In the air-fuel ratio control apparatus of the internal combustion engine according to the present invention, the air-fuel ratio controlling means may perform an air-fuel ratio control by the lean control means during an idle operation of the internal combustion engine. Since an air intake quantity is decreased during the idle operation, the exhaust gas quantity emitted from the internal combustion engine also is decreased. Therefore, it is possible to suppress the degradation of the exhaust emission by controlling the air-fuel ratio to be a lean air-fuel ratio during this period of time.

In the air-fuel ratio control apparatus of the internal combustion engine according to the present invention, the air-fuel ratio controlling means may perform an air-fuel ratio control by the intermediate lean control means during a substantially steady operation in a partial load region of the internal combustion engine. If the air-fuel ratio in the internal combustion engine is controlled to be a lean air-fuel ratio during a full load operation or an unsteady operation of the internal combustion engine, the operating state of the internal combustion engine becomes unstable, thereby deteriorating drivability. Thus, the air-fuel ratio is controlled by the intermediate lean controlling means during the substantially steady operation in the partial load region of the internal combustion engine, thereby suppressing the deterioration of the operating state of the internal combustion engine.

In the air-fuel ratio control apparatus of the internal combustion engine according to the present invention, the intermediate lean control means may make the air-fuel ratio in the internal combustion engine change to a lean air-fuel ratio by the smaller amount than the lean control means. The intermediate lean control means can turn the first exhaust gas purifying catalyst to the lean state, and further, can change the air-fuel ratio within the range not enough to turn the second exhaust gas purifying catalyst to the lean state by changing the air-fuel ratio in the above-described manner.

In the air-fuel ratio control apparatus of the internal combustion engine according to the present invention, the air-fuel ratio controlling means may not perform any air-fuel ratio control by the lean control means and the intermediate lean control means when judged that the temperature of the first exhaust gas purifying catalyst or the temperature of the second exhaust gas purifying catalyst is higher than a predetermined temperature at which the degradation of the catalyst is intensified. The degradation of the exhaust gas purifying catalyst is intensified as the quantity of oxygen becomes more excessive at higher temperatures. Therefore, when the temperature of the first exhaust gas purifying catalyst or the second exhaust gas purifying catalyst is higher than the predetermined temperature (for example, 800° C.) at which the degradation of the catalyst is intensified, the degradation of the catalyst can be suppressed unless the air-fuel ratio control is performed by the lean control means and the intermediate lean control means.

In the air-fuel ratio control apparatus of the internal combustion engine according to the present invention, the air-fuel ratio controlling means may include rich control means for performing control to change the air-fuel ratio in the internal combustion engine to a rich air-fuel ratio within the range not enough to make both of the first exhaust gas purifying catalyst and the second exhaust gas purifying catalyst rich after the air-fuel ratio control by the lean control means. The exhaust gas purifying catalyst purifies an oxidized component such as $NO_x$ by occluding the resultant oxygen produced after reduction of the oxidized component such as $NO_x$ contained in the exhaust gas. Therefore, when both of the first and second exhaust gas purifying catalysts are lean, no oxygen is occluded, so that oxidized component such as $NO_x$ cannot be purified. Accordingly, the rich controlling means changes the air-fuel ratio in the internal combustion engine to a rich side within the range not enough to turn both of the first and second exhaust gas purifying catalysts to the rich state (that is, the state in which the catalytic atmosphere becomes rich by emitting the oxygen occluded in the catalyst), thereby partially emitting the oxygen occluded in the exhaust gas purifying catalyst. In this manner, the degradation of the exhaust emission can be suppressed by turning the exhaust gas purifying catalyst in such a manner as to occlude the oxygen therein.

The air-fuel ratio control apparatus of the internal combustion engine according to the present invention further may include learning controlling means for controlling feedback learning relating to the air-fuel ratio in the internal combustion engine; and correcting means for feedback correcting a quantity of fuel to be supplied to the internal combustion engine such that the air-fuel ratio in the internal combustion engine becomes a target air-fuel ratio based on the air-fuel ratio acquired by the second air-fuel ratio acquiring means, wherein the air-fuel ratio controlling means may prohibit any operation of the learning controlling means and the correcting means during the air-fuel ratio control by the lean control means and the intermediate lean control means. The feedback learning relating to the air-fuel ratio in the internal combustion engine includes, for example, learning for correcting a quantity of fuel to be supplied to the internal combustion engine based on a difference between the target air-fuel ratio and the detected air-fuel ratio of exhaust gas. Such learning during the air-fuel ratio control may lead to learning of erroneous correction. Accordingly, erroneous learning can be prevented by prohibiting the operation of the learning controlling means. Furthermore, since the correcting means corrects the air-fuel ratio in the internal combustion engine based on the air-fuel ratio acquired by the second air-fuel ratio acquiring means, there is a possibility that the air-fuel ratio may be corrected to the rich air-fuel ratio when the air-fuel ratio is controlled to be the lean air-fuel ratio under, for example, the air-fuel ratio control based on the acquired air-fuel ratio. Therefore, when the air-fuel ratio is controlled by the lean control means and the intermediate lean control means, the air-fuel ratio can be properly controlled by the air-fuel ratio controlling means by prohibiting the operation of the correcting means.

The air-fuel ratio control apparatus of the internal combustion engine according to the present invention may include oxygen quantity acquiring means for acquiring a quantity of oxygen occluded in the second exhaust gas purifying catalyst by integrating an excess or shortage amounts of oxygen in the exhaust gas calculated based on the air-fuel ratio in the internal combustion engine both when judged that the air-fuel ratio in the internal combustion engine is lean and the air-fuel ratio acquired by the second air-fuel ratio acquiring means is lean and when judged that the air-fuel ratio in the internal combustion engine is rich and the air-fuel ratio acquired by the second air-fuel ratio acquiring means is rich, wherein the air-fuel ratio controlling means may judge as to whether the second exhaust gas purifying catalyst is lean based on the quantity of oxygen acquired by the oxygen quantity acquiring means. When the air-fuel ratio in the internal combustion engine is lean and the air-fuel ratio acquired by the second air-fuel ratio acquiring means is lean, it is considered that the first exhaust gas purifying catalyst becomes lean. Therefore, the exhaust gas having the lean air-fuel ratio emitted from the internal combustion engine flows into the second exhaust gas purifying catalyst as it is. In this case, the second exhaust gas purifying catalyst occludes therein the oxygen contained in the exhaust gas having the lean air-fuel ratio until the oxygen occlusion quantity in the second exhaust gas purifying catalyst becomes maximum. In contrast, when the air-fuel ratio in the internal combustion engine is rich and the air-fuel ratio acquired by the second air-fuel ratio acquiring means is rich, it is considered that the first exhaust gas purifying catalyst occludes therein little oxygen. Therefore, the exhaust gas having the rich air-fuel ratio emitted from the internal combustion engine flows into the second exhaust gas purifying catalyst as it is. In this case, the second exhaust gas purifying catalyst emits the occluded oxygen until there remains little occluded oxygen such that the air-fuel ratio of the exhaust gas is made stoichiometric. Consequently, the quantity of oxygen occluded in the second exhaust gas purifying catalyst can be acquired by integrating the excess or shortage amounts of oxygen contained in the exhaust gas, which is calculated based on the air-fuel ratio in the internal combustion engine when the state of the air-fuel ratio in the internal combustion engine accords with the state of the air-fuel ratio acquired by the second air-fuel ratio acquiring means in the above-described manner. Thus, it is possible to more accurately judge the lean state by utilizing the quantity of oxygen occluded in the acquired second exhaust gas purifying catalyst.

In the air-fuel ratio control apparatus of the internal combustion engine according to the present invention, the oxygen quantity acquiring means may vary a maximum oxygen occlusion quantity of the second exhaust gas purifying catalyst according to the degradation state of the second exhaust gas purifying catalyst and the temperature of the second exhaust gas purifying catalyst. The maximum quantity of oxygen occluded in the exhaust gas purifying catalyst becomes greater as the temperature of the catalyst becomes higher. In contrast, the maximum occlusion quantity of oxygen becomes smaller as the catalyst becomes more degraded. Thus, it is possible to more accurately acquire the oxygen occlusion quantity by changing the maximum occlusion quantity of oxygen according to the degradation state and temperature of the catalyst.

BRIEF DESCRIPTION OF THE DRAWINGS

FIGS. 7A and 7B are graphs showing maps for use in the calculation routine shown in FIG. 5.

BEST MODES FOR CARRYING OUT THE INVENTION

Figure 1:
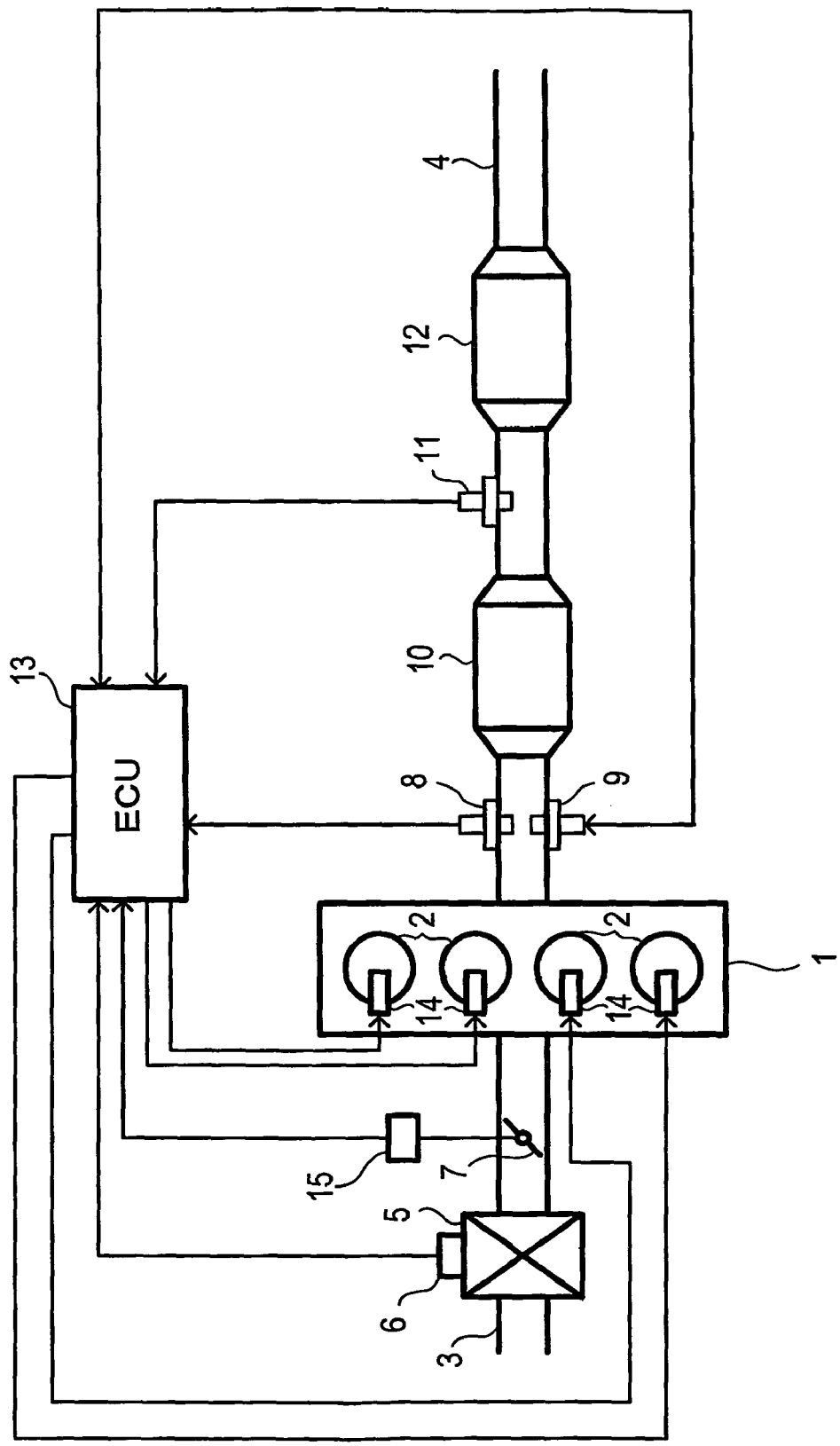
FIG. 1 is a diagram showing an internal combustion engine, to which an air-fuel ratio control apparatus according to the present invention is applied, in the first embodiment.

FIG. 1 is a diagram showing an internal combustion engine, to which an air-fuel ratio control apparatus according to the present invention is applied, in the first embodiment. An internal combustion engine 1 is provided with a plurality of cylinders 2 (four in FIG. 1). As well known, to the internal combustion engine 1 are connected an intake passage 3 and an exhaust passage 4. In the air intake passage 3, there are provided an air filter 5 for filtrating intake air, an air flow sensor 6 for outputting a signal corresponding to an intake air quantity, and a throttle valve 7 for adjusting the intake air quantity. In the exhaust passage 4, there are provided an air-fuel ratio sensor 8, serving as first air-fuel ratio acquiring means, for outputting a signal corresponding to an air-fuel ratio of exhaust gas emitted from the internal combustion engine 1, an exhaust gas temperature sensor 9 for outputting a signal according to a temperature of the exhaust gas, a start catalyst 10 serving as a first exhaust gas purifying catalyst, an oxygen concentration sensor 11, serving as second air-fuel ratio acquiring means, for outputting a signal corresponding to a concentration of oxygen contained in the exhaust gas, and a three way catalyst 12 serving as a second exhaust gas purifying catalyst. The start catalyst 10 is provided for the purpose of reduction of an exhaust quantity of hazardous substance until the three way catalyst 12 is activated at the time of cold start of the internal combustion engine 1. As the start catalyst 10 is used, for example, a three way catalyst. These catalysts 10 and 12 can occlude oxygen therein. When carbon monoxygen (CO) or hydrocarbon (HC) contained in the exhaust gas is purified by oxidizing CO or HC using the occluded oxygen. Otherwise, when an oxidized component such as $NO_x$ is contained in the exhaust gas, the oxidized component is reduced, thereby purifying the exhaust gas. Incidentally, the oxygen produced during this reduction is occluded in the catalysts 10 and 12.

The operating state of the internal combustion engine 1 is controlled by an engine control unit (hereinafter abbreviated as "an ECU") 13. The ECU 13 is configured as a computer including a microprocessor and peripheral means such as a ROM and a RAM required for operation of the microprocessor in combination. The ECU 13 controls operation of a fuel injection valve 14 disposed for each of the cylinders 2 in reference to an output from, for example, the air-fuel ratio sensor 8 or the oxygen concentration sensor 11, and further, supplies a proper quantity of fuel to each of the cylinders 2 such that the air-fuel ratio of the exhaust gas becomes a target air-fuel ratio. In this manner, the ECU 13 functions as air-fuel ratio controlling means by controlling the operation of the fuel injection valve 14. Furthermore, the ECU 13 functions also as correcting means for feedback correcting a quantity of fuel in reference to the output from the oxygen concentration sensor 11 in such a manner that an air-fuel ratio in the internal combustion engine 1 becomes the target air-fuel ratio. In addition, to the ECU 13 are connected an idle switch (hereinafter referred to "an idle SW") 15 for outputting an ON signal when the throttle valve 7 is located at an idling position, the exhaust gas temperature sensor 9 and the like.

Additionally, the ECU 13 performs feedback learning for changing a parameter (for example, a valve opening time) for use in controlling the operation of the fuel injection valve 14 in reference to the outputs from the air-fuel ratio sensor 8 and the oxygen concentration sensor 11. Here, specific procedures of the feedback learning may be the same as well-known learning control, and therefore, the detailed description will be omitted. The ECU 13 functions as learning controlling means by performing the feedback learning in the above-described manner.

Figure 2:
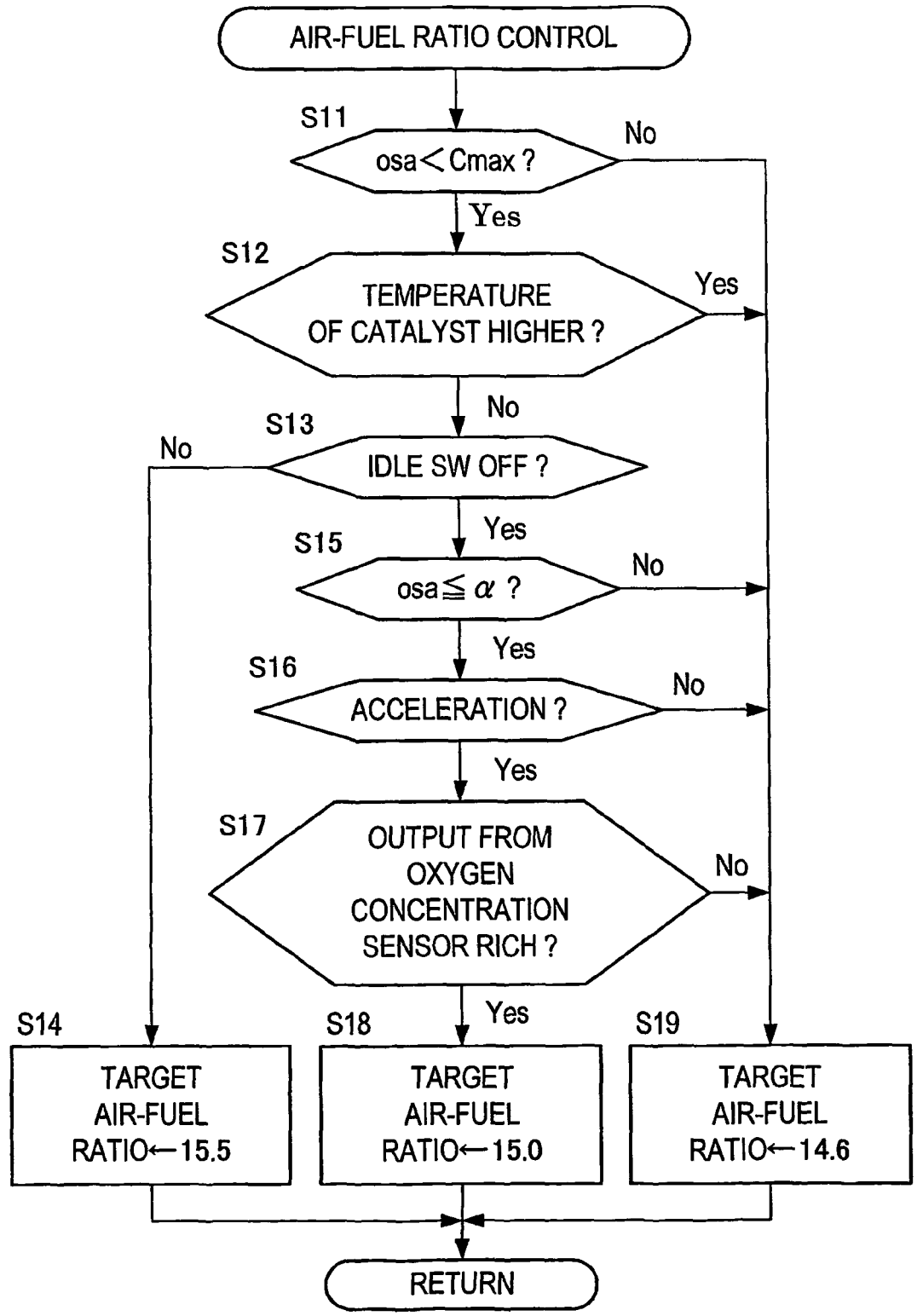
FIG. 2 is a flowchart showing an air-fuel ratio control routine executed by an ECU shown in FIG. 1.

The ECU 13 allows a sufficient quantity of oxygen to be occluded in the start catalyst 10 and the three way catalyst 12 till the deceleration or stoppage of the internal combustion engine 1, so as to turn the catalysts to a lean state. FIG. 2 is a flowchart showing an air-fuel ratio control routine executed by the ECU 13 in order to allow the oxygen to be occluded in the start catalyst 10 and the three way catalyst 12. The control routine shown in FIG. 2 is executed repeatedly in a predetermined cycle after a fuel quantity increasing operation of the internal combustion engine 1. Incidentally, during the execution of this control routine, the ECU 13 prohibits the feedback learning based on the outputs from the air-fuel ratio sensor 8 and the oxygen concentration sensor 11. Moreover, the ECU 13 also prohibits the feedback correction, which is executed for correcting a fuel injection quantity in reference to the output from the oxygen concentration sensor 11.

In the air-fuel ratio control routine shown in FIG. 2, the ECU 13 first judges in step S11 as to whether a quantity of oxygen (osa) occluded in the three way catalyst 12 is smaller than a maximum oxygen occlusion quantity (Cmax) of the three way catalyst 12. Here, the quantity of oxygen (osa) occluded in the three way catalyst 12 can be acquired by executing a control routine shown in FIGS. 5 and 6, described later. If it is judged that the quantity of oxygen (osa) is smaller than the maximum oxygen occlusion quantity (Cmax), the control routine proceeds to step S12, in which the ECU 13 judges as to whether the temperature of the start catalyst 10 or the three way catalyst 12 is higher than a predetermined temperature (for example, 800° C.) at which the degradation of the catalyst is intensified. The temperature of the start catalyst 10 or the three way catalyst 12 can be estimated in reference to the output from, for example, the exhaust gas temperature sensor 9. If it is judged that the temperature of the start catalyst 10 and the three way catalyst 12 are not higher than the predetermined temperature, the control routine proceeds to step S13, in which the ECU 13 judges as to whether the idle SW 15 is OFF. If it is judged that the idle SW 15 is not OFF, the control routine proceeds to step S14, in which the ECU 13 sets the target air-fuel ratio to 15.5. Thereafter, the present control routine is ended.

In contrast, if it is judged that the idle SW 15 is OFF, the control routine proceeds to step S15, in which the ECU 13 judges as to whether the quantity of oxygen (osa) of the three way catalyst 12 is equal to or smaller than a predetermined judgment occlusion quantity ($\alpha$) as a criterion for the lean control. As the predetermined judgment occlusion quantity ($\alpha$) is used, for example, an oxygen occlusion quantity, at which the three way catalyst 12 can be turned to the lean state by the lean control during the idle operation of the internal combustion engine 1. If it is judged that the occlusion quantity of oxygen is equal to or smaller than the judgment occlusion quantity, the control routine proceeds to step S16, in which the ECU 13 judges as to whether the internal combustion engine 1 is being accelerated. The acceleration can be estimated in reference to, for example, an opening degree of the throttle valve 7. In contrast, if it is judged that the internal combustion engine 1 is not being accelerated, the control routine proceeds to step S17, in which the ECU 13 judges as to whether the output from the oxygen concentration sensor 11 is on the rich side, which indicates that the concentration of the oxygen contained in the exhaust gas is low. If it is judged that the output from the oxygen concentration sensor 11 is on the rich side, the control routine proceeds to step S18, in which the ECU 13 sets the target air-fuel ratio to 15.0. Thereafter, the present control routine is ended.

If it is judged in step S11 that the quantity of oxygen occluded in the three way catalyst 12 is not smaller than the Cmax, it is judged in step S12 that the temperature of at least one of the catalysts is higher, it is judged in step S15 that the oxygen occlusion quantity is not the judgment occlusion quantity or smaller, it is judged in step S16 that the internal combustion engine 1 is being accelerated, or it is judged in step S17 that the output from the oxygen concentration sensor 11 is not on the rich side, the control routine proceeds to step S19, in which the ECU 13 sets the target air-fuel ratio to 14.6. Thereafter, the present control routine is ended.

Figure 3:
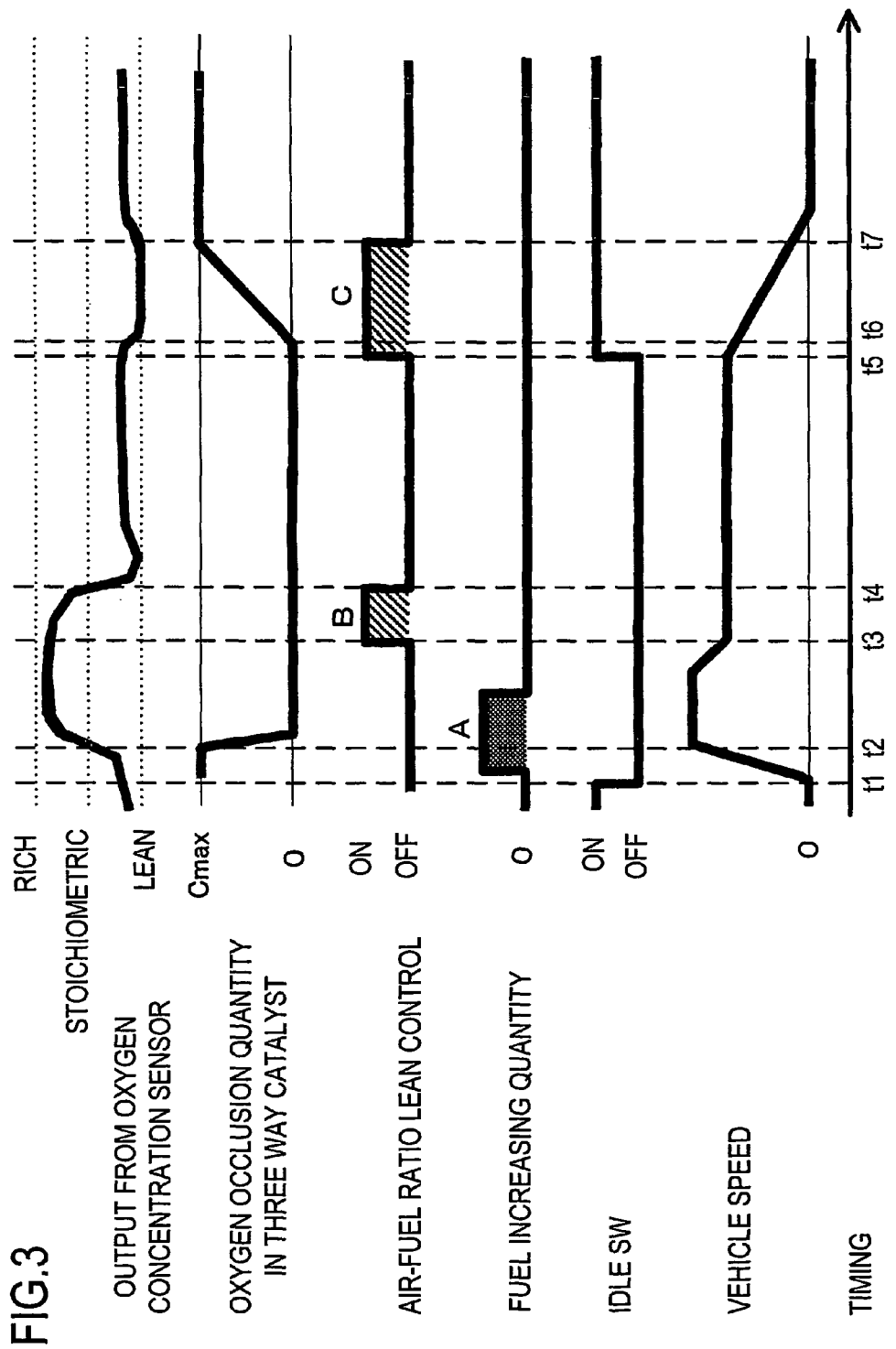
FIG. 3 is a timing chart showing one example of temporal changes of an oxygen occlusion quantity in a three way catalyst and an output from an oxygen concentration sensor when the control routine shown in FIG. 2 is executed.

FIG. 3 is a timing chart showing one example of temporal changes of the oxygen occlusion quantity in the three way catalyst 12 and an output from the oxygen concentration sensor 11 when the air-fuel ratio in the internal combustion engine 1 is controlled to be lean by executing the control routine shown in FIG. 2. In FIG. 3, the internal combustion engine 1 is mounted on a vehicle, and the operating state of the internal combustion engine 1 is represented by a vehicle speed. In addition, the temperatures of the catalysts 10 and 12 in FIG. 3 are assumed to be lower than the predetermined temperature, at which the degradation of the catalyst is intensified (in other words, the judgment in step S12 in FIG. 2 is negative).

At a timing t1 in FIG. 3, the quantity of fuel to be supplied to the internal combustion engine 1 is increased by changing the operating state of the vehicle from stoppage to acceleration (indicated by reference character A in FIG. 3). The air-fuel ratio of the exhaust gas in the internal combustion engine 1 becomes rich by the above-described fuel quantity increasing operation, and then, the oxygen occluded in the start catalyst 10 is first emitted. Consequently, the output from the oxygen concentration sensor 11 indicates a lean side until there is no oxygen occluded in the start catalyst 10 after the start of the fuel quantity increasing operation. When the output from the oxygen concentration sensor 11 is changed from the lean side to the rich side (at a timing t2 in FIG. 3), in other words, when substantially no oxygen is occluded in the start catalyst 10, the exhaust gas having the rich air-fuel ratio flows into the three way catalyst 12, thereby emitting the oxygen occluded in the three way catalyst 12. In this manner, the oxygen occlusion quantity in the three way catalyst 12 becomes zero.

When the internal combustion engine 1 is rendered into a substantially steady operation in the partial load region after the fuel quantity increasing operation (at a timing t3 in FIG. 3), the air-fuel ratio is set to 15.0 according to the processing in step S18 in FIG. 2, and then, the lean control (i.e., a partial lean control) is started (indicated by reference character B in FIG. 3). The oxygen can be occluded in the start catalyst 10 by the partial lean control. The partial lean control is performed until it is judged that the output from the oxygen concentration sensor 11 is not on the rich side, or the judgment in step S17 turns to be negative (till a timing t4 in FIG. 3). Since the exhaust gas having the lean air-fuel ratio, emitted from the internal combustion engine 1 passes the start catalyst 10 as it is if the output from the oxygen concentration sensor 11 is on the lean side, the oxygen is occluded in the start catalyst 10 until it reaches a maximum oxygen occlusion quantity (SCmax) thereof. Incidentally, the partial lean control is terminated at a timing at which the output from the oxygen concentration sensor 11 turns to the lean side, and therefore, the oxygen has not been occluded yet in the three way catalyst 12. In this manner, the start catalyst 10 is made lean by occluding the oxygen in the start catalyst 10 until it reaches the maximum oxygen occlusion quantity (SCmax) of the start catalyst 10; in contrast, no oxygen is occluded in the three way catalyst 12 by leanly controlling the air-fuel ratio. Thus, the ECU 13 functions as an intermediate lean controlling means.

When the throttle valve 7 is located at the idling position and the output from the idle SW 15 becomes ON at a timing t5 in FIG. 3, the judgment in step S13 in FIG. 2 is negative, so that the target air-fuel ratio is set to 15.5, thereby starting the lean control, i.e. the idle lean control (indicated by reference character C in FIG. 3). Since the oxygen is occluded in quantity substantially approximate to the maximum oxygen occlusion quantity (SCmax) in the start catalyst 10 at this timing, the lean exhaust gas emitted from the internal combustion engine 1 flows into the three way catalyst 12 as it is. Therefore, the oxygen is occluded in the three way catalyst 12 by the idle lean control (at timings t6 and t7 in FIG. 3). The idle lean control is performed until the quantity of oxygen occluded in the three way catalyst 12 reaches the maximum oxygen occlusion quantity (Cmax) thereof and the three way catalyst 12 becomes lean (that is, the judgment in step S11 in FIG. 2 is negative). Thus, the ECU 13 functions as lean controlling means by performing the lean control until the three way catalyst 12 becomes lean.

As described above, the target air-fuel ratio in the internal combustion engine 1 is set to a lean air-fuel ratio till the stoppage of the internal combustion engine 1 by executing the control routine shown in FIG. 2, so that the oxygen can be securely occluded in each of the start catalyst 10 and the three way catalyst 12 up to the maximum oxygen occlusion quantity.

Subsequently, there is explained a method for acquiring the oxygen occlusion quantity (osa) in the three way catalyst 12 used in step S11 in FIG. 2. First, the concept of the judgment of the state of the three way catalyst 12 based on the output from the oxygen concentration sensor 11 will be described below in reference to FIG. 4.

Figure 4:
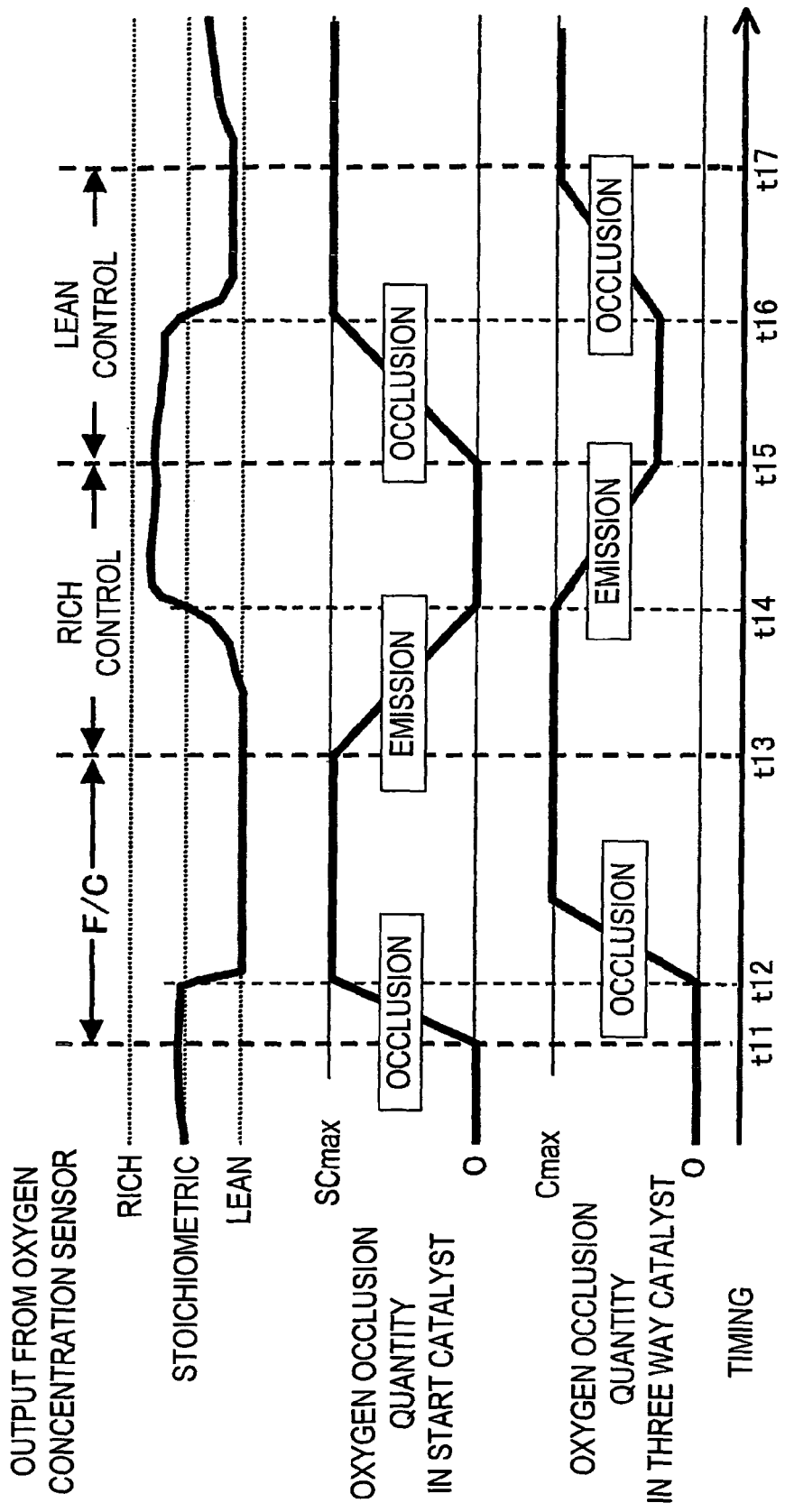
FIG. 4 is a timing chart showing one example of temporal changes of an oxygen occlusion quantities in a start catalyst and the three way catalyst when an air-fuel ratio in the internal combustion engine is changed.

It is assumed that no oxygen is occluded in each of the start catalyst 10 and the three way catalyst 12 in an initial state in FIG. 4. When the fuel to be supplied to the internal combustion engine 1 is cut in this state (hereinafter, this fuel cut operation is referred to as F/C) at a timing t11 in FIG. 4, the air-fuel ratio of the exhaust gas becomes lean, and therefore, the oxygen contained in the lean exhaust gas is occluded in the start catalyst 10. When the oxygen is occluded in the start catalyst 10 up to the maximum oxygen occlusion quantity (SCmax) of the start catalyst 10, the lean exhaust gas flows downstream of the start catalyst 10. Consequently, the oxygen concentration sensor 11 outputs a signal indicating leanness, thereby starting the occlusion of the oxygen in the three way catalyst 12 (at a timing t12 in FIG. 4).

Next, when the air-fuel ratio of the exhaust gas becomes rich by performing the rich control, under which the air-fuel ratio in the internal combustion engine 1 becomes rich (at a timing t13 in FIG. 4), the start catalyst 10 emits the oxygen in such a manner as to make the rich exhaust gas stoichiometric. When there remains no oxygen occluded in the start catalyst 10, the oxygen concentration sensor 11 outputs a signal indicating richness, because the rich exhaust gas as it is flows downstream of the start catalyst 10, thereby starting the emission of the oxygen from the three way catalyst 12 (at a timing t14 in FIG. 4).

Thereafter, when the air-fuel ratio of the exhaust gas becomes lean by performing the lean control, under which the air-fuel ratio in the internal combustion engine 1 becomes lean (at a timing t15 in FIG. 4), the oxygen contained in the lean exhaust gas is occluded in the start catalyst 10. When the oxygen is occluded in the start catalyst 10 up to the maximum oxygen occlusion quantity (SCmax), the oxygen concentration sensor 11 outputs a signal indicating leanness, because the lean exhaust gas flows downstream of the start catalyst 10, thereby starting the occlusion of the oxygen in the three way catalyst 12 (at a timing t16 in FIG. 4).

As described above, when the air-fuel ratio in the internal combustion engine 1 is lean and the oxygen concentration sensor 11 outputs the signal indicating the leanness, the oxygen is occluded in the three way catalyst 12. In contrast, when the air-fuel ratio in the internal combustion engine 1 is rich and the oxygen concentration sensor 11 outputs the signal indicating the richness, the oxygen is emitted from the three way catalyst 12.

Figure 5:
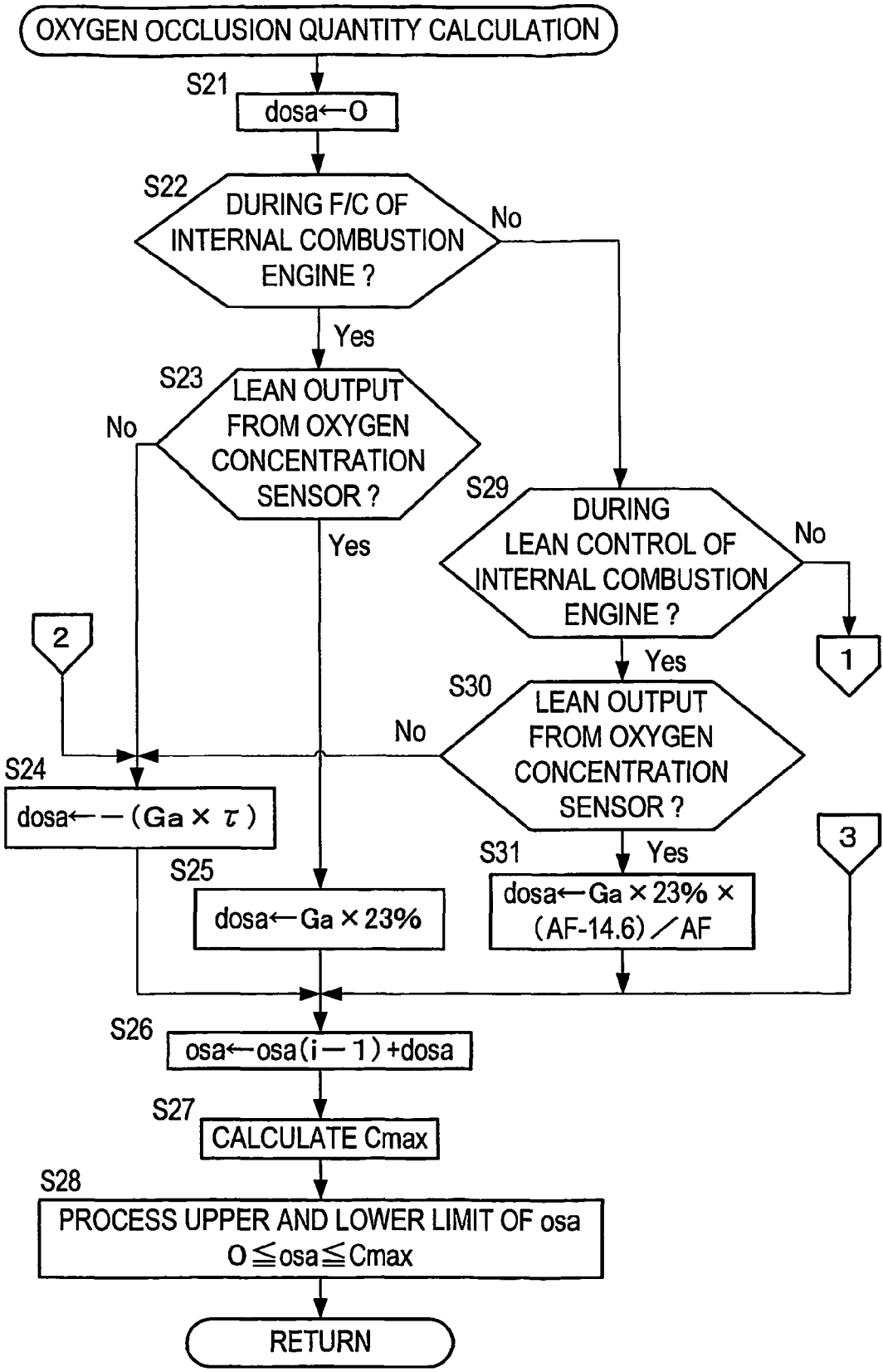
FIG. 5 is a flowchart showing a calculation routine executed for calculating the oxygen occlusion quantity of the three way catalyst by the ECU shown in FIG. 1.
Figure 6:
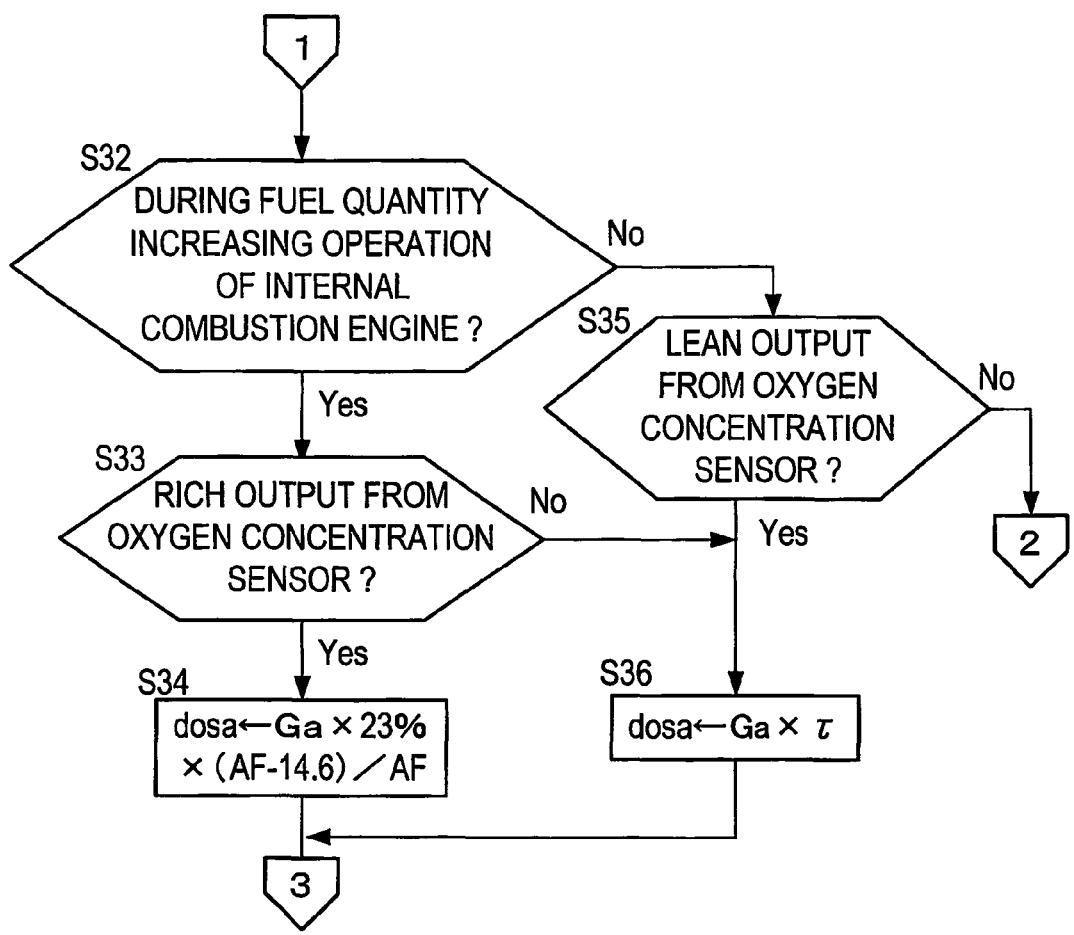
FIG. 6 is a flowchart following FIG. 5.

As a result, it is possible to grasp the state of the three way catalyst 12 based on the air-fuel ratio in the internal combustion engine 1 and the output from the oxygen concentration sensor 11. Thus, the oxygen occlusion quantity (osa) in the three way catalyst 12 can be estimated by executing an oxygen occlusion quantity calculation routine shown in FIGS. 5 and 6 by the ECU 13. The control routine shown in FIGS. 5 and 6 is executed repeatedly in a predetermined cycle during the operation of the internal combustion engine 1. The ECU 13 functions as oxygen quantity acquiring means by executing the oxygen occlusion quantity calculation routine shown in FIGS. 5 and 6.

In the oxygen occlusion quantity calculation routine shown in FIG. 5, the ECU 13 first substitutes 0 into an intake oxygen quantity (dosa) taken into the three way catalyst 12, and thus, initializes a value (dosa) in step S21. Next in step S22, the ECU 13 judges as to whether the internal combustion engine 1 operates the F/C. If it is judged that the internal combustion engine 1 operates the F/C, the control routine proceeds to step S23, in which the ECU 13 judges as to whether the oxygen concentration sensor 11 indicates the lean side. If it is judged that the oxygen concentration sensor 11 does not indicate the lean side, the control routine proceeds to step S24, in which the ECU 13 substitutes, into the intake oxygen quantity (dosa), a value obtained by multiplying an intake air quantity (Ga) in the internal combustion engine 1 by a coefficient τ, followed by multiplication by −1. Here, the coefficient τ is a small coefficient value set for calculating the oxygen quantity flowing into the three way catalyst when the oxygen concentration sensor 11 indicates the rich or lean side during the stoichiometric operation of the internal combustion engine 1.

In contrast, if it is judged that the oxygen concentration sensor 11 indicates the lean side, the control routine proceeds to step S25, in which the ECU 13 substitutes a value obtained by multiplying the intake air quantity (Ga) by 23% into the intake oxygen quantity (dosa). Here, the percentage 23% expresses a weight ratio of oxygen in the air. In next step S26, the ECU 13 substitutes, into the oxygen occlusion quantity (osa) of the three way catalyst 12, a value obtained by adding the intake oxygen quantity (dosa) calculated this time into the oxygen occlusion quantity (osa(i−1)) of the three way catalyst 12 calculated in executing the previous calculation routine in FIG. 5. Incidentally, the control routine proceeds to step S26 also after the completion of the processing in step S24. In subsequent step S27, the ECU 13 calculates the maximum oxygen occlusion quantity (Cmax) of the three way catalyst 12. The Cmax is varied according to the degradation state of the catalyst 12 and the temperature of the catalyst 12. For example, the Cmax is decreased due to the degradation of the catalyst 12. Otherwise, the Cmax is increased as the temperature is higher. Thus, the Cmax obtained in reference to a map shown in a graph in FIG. 7A is multiplied by a correction coefficient obtained in reference to a map shown in a graph in FIG. 7B. Incidentally, the temperature of the catalyst 12 can be estimated in reference to the output from the exhaust gas temperature sensor 9.

FIG. 7A shows one example of the relationship between the maximum oxygen occlusion quantity (SCmax) of the start catalyst 10 and the maximum oxygen occlusion quantity (Cmax) of the three way catalyst 12. Since it is considered that the three way catalyst 12 and the start catalyst 10 are degraded in substantially the same manner, the degradation state of the three way catalyst 12 can be estimated in reference to the degradation state of the start catalyst 10. As is clear from FIG. 7A, the proportional relationship between the SCmax and the Cmax is established, so that the Cmax can be estimated based on the variations in SCmax due to the degradation of the start catalyst 10. Incidentally, the SCmax varied due to the degradation of the start catalyst 10 can be acquired by, for example, a method, described below, in reference to the outputs from the air-fuel ratio sensor 8 and the oxygen concentration sensor 11.

In the case that the internal combustion engine 1 is under the rich control and the output from the oxygen concentration sensor 11 turns to the rich side, as described in the explanation in reference to FIG. 4, it can be judged that the oxygen occlusion quantity in the start catalyst 10 is zero. In contrast, in the case that the internal combustion engine 1 is in the lean control or the F/C, and that the output from the oxygen concentration sensor 11 turns to the lean side, it can be judged that the oxygen is occluded in the start catalyst 10 up to the SCmax. Thus, when the internal combustion engine 1 is substantially steadily operated in the partial load region, the rich control is performed for the internal combustion engine 1, so that the oxygen occlusion quantity becomes zero by emitting the oxygen from the start catalyst 10. Next, the lean control is performed for the internal combustion engine 1, and then, the oxygen is occluded in the start catalyst 10 up to the SCmax. It can be judged based on the output from the oxygen concentration sensor 11 whether the oxygen occlusion quantity in the start catalyst 10 becomes zero or the SCmax, as described above. The SCmax can be acquired by integrating values obtained by multiplying a quantity of air taken into the internal combustion engine 1 until the output from the oxygen concentration sensor 11 becomes lean after the lean control for the internal combustion engine 1 by a difference between the air-fuel ratio detected by the air-fuel ratio sensor 8 during the lean control and the stoichiometric air-fuel ratio.

Returning to the explanation on the control routine shown in FIG. 5, the control routine proceeds to step S28 after the Cmax is calculated in step S27, and then, the ECU 13 executes upper/lower limit processing as to whether the oxygen occlusion quantity (osa) in the three way catalyst 12 is zero or greater and the Cmax or smaller. The calculation of an abnormal value of the oxygen occlusion quantity is prevented by the above-described processing. Thereafter, the present routine is ended.

If it is judged in step S22 that the F/C is not performed, the control routine proceeds to step S29, in which the ECU 13 judges as to whether the lean control is performed for the internal combustion engine 1. If it is judged that the lean control is performed, the control routine proceeds to step S30, in which the ECU 13 judges as to whether the oxygen concentration sensor 11 outputs the lean signal. If it is judged that the oxygen concentration sensor 11 does not output the lean signal, the control routine proceeds to step S24. Hereinafter, the processing in steps S26 to S28 is executed, and thereafter, the present control routine is ended. In contrast, if it is judged that the oxygen concentration sensor 11 outputs the lean signal, the control routine proceeds to step S31, in which the ECU 13 substitutes a value obtained by calculation according to the expression of Ga×23%×(AF−14.6)/AF into the intake oxygen quantity (dosa). Here, 14.6 represents a stoichiometric air-fuel ratio; and AF represents an air-fuel ratio detected by the air-fuel ratio sensor 8. Subsequently, the processing in steps S26 to S28 is executed, and thereafter, the present routine is ended.

If it is judged in step S29 that the lean control is not performed for the internal combustion engine 1, the control routine proceeds to step S32 in FIG. 6, in which the ECU 13 judges as to whether the fuel quantity increasing operation is performed in the internal combustion engine 1. If it is judged that the fuel quantity increasing operation is performed, the control routine proceeds to step S33, in which the ECU 13 judges as to whether the oxygen concentration sensor 11 outputs the rich signal. If it is judged that the oxygen concentration sensor 11 outputs the rich signal, the control routine proceeds to step S34, in which the ECU 13 substitutes the value obtained by the calculation according to the expression of Ga×23%×(AF−14.6)/AF into the intake oxygen quantity (dosa). In this case, since the fuel quantity increasing operation is performed in the internal combustion engine 1, the value AF becomes a rich value, i.e. the value smaller than 14.6. Therefore, the intake oxygen quantity (dosa) calculated in step S34 becomes a negative value, and this negative value is added into the oxygen occlusion quantity (osa), thereby representing the emission of the oxygen from the catalyst 12. Subsequently, the processing in steps S26 to S28 in FIG. 5 is executed, and thereafter, the present routine is ended. In contrast, if it is judged that the oxygen concentration sensor 11 does not output the rich signal, the control routine proceeds to step S36, in which the ECU 13 substitutes the value Ga×τ into the intake oxygen quantity (dosa). Subsequently, the processing in steps S26 to S28 in FIG. 5 is executed, and thereafter, the present routine is ended.

If it is judged in step S32 that the fuel quantity increasing operation is not performed in the internal combustion engine 1, the control routine proceeds to step S35, in which the ECU 13 judges as to whether the oxygen concentration sensor 11 outputs the lean signal. If it is judged that the oxygen concentration sensor 11 outputs the lean signal, the control routine proceeds to step S36. Hereinafter, the processing in steps S26 to S28 in FIG. 5 is executed, and thereafter, the present routine is ended. In contrast, if it is judged that the oxygen concentration sensor 11 does not output the lean signal, the control routine proceeds to step S24 in FIG. 5. Hereinafter, the processing in steps S26 to S28 in FIG. 5 is executed, and thereafter, the present routine is ended.

In this manner, the excess or shortage amounts of the oxygen contained in the exhaust gas are integrated by executing the control routine shown in FIGS. 5 and 6, so that the oxygen occlusion quantity (osa) in the three way catalyst 12 can be calculated. Incidentally, when the judgment in step S23 is negative or the judgment in step S30 is negative, the control routine may skip the processing in step S24 to proceed to the processing in step S26. Also when the judgment in step S32 is negative, the control routine may skip the processing in step S35 to proceed to the processing in step S26. With the skip of the processing in this manner, the calculation routine can be simplified.

Figure 8:
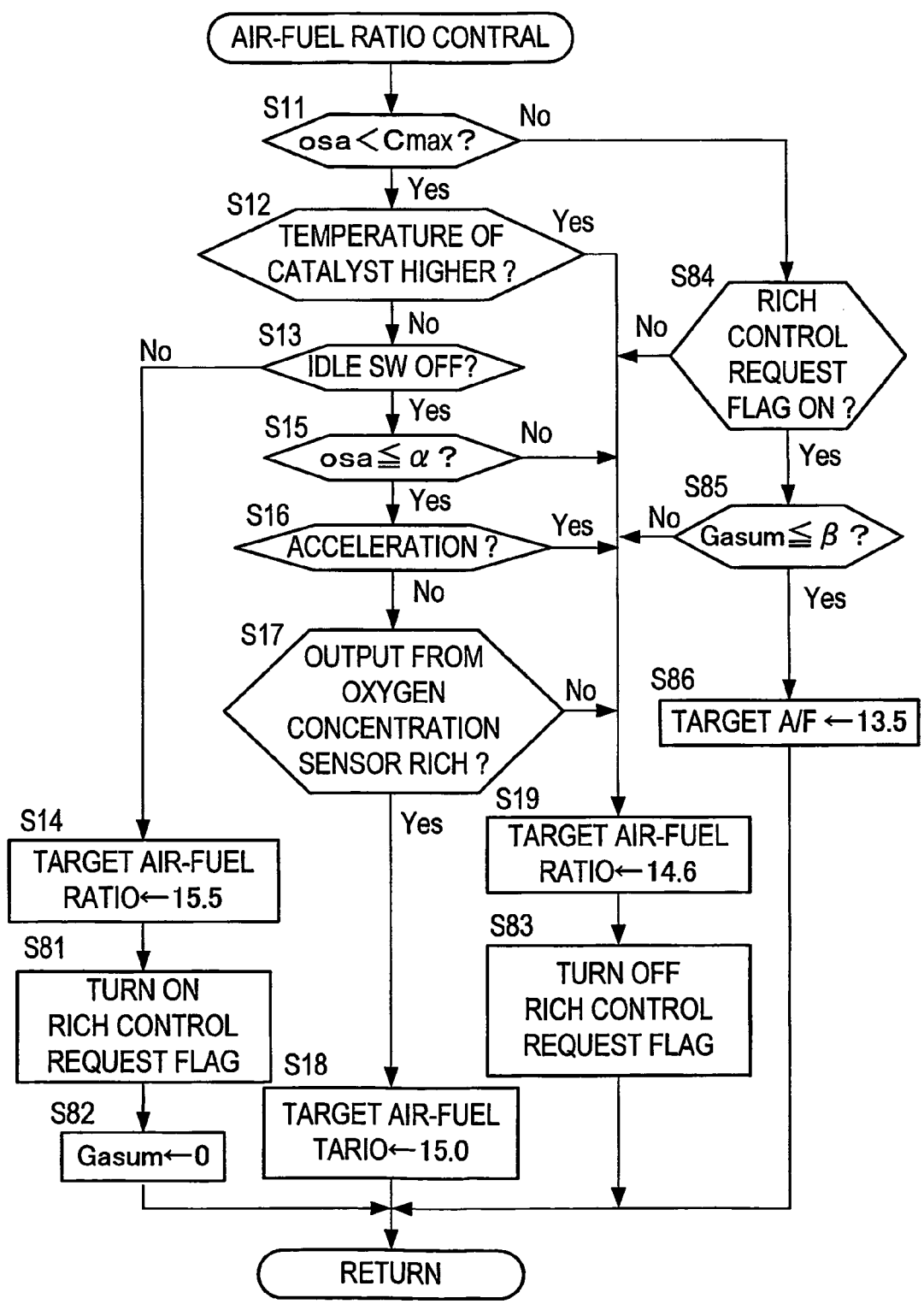
FIG. 8 is a flowchart showing another air-fuel ratio control routine executed by the ECU shown in FIG. 1.

FIG. 8 is a flowchart showing another air-fuel ratio control routine executed by the air-fuel ratio control apparatus according to the present invention. The control routine shown in FIG. 8 is different from the control routine shown in FIG. 2 in that the air-fuel ratio in the internal combustion engine 1 is controlled to be rich after the oxygen is occluded in the three way catalyst 12 up to the maximum oxygen occlusion quantity. The control routine shown in FIG. 8 is executed repeatedly in the predetermined cycle after the fuel quantity increasing operation of the internal combustion engine 1. Here, the same processing in FIG. 8 as that in FIG. 2 is designated by the same reference numeral, and therefore, its explanation will not repeated. Furthermore, also during the execution of the control routine shown in FIG. 8, the feedback learning and the feedback correction by the oxygen concentration sensor 11 are prohibited.

In the air-fuel ratio control routine shown in FIG. 8, the ECU 13 first judges in step S11 as to whether the osa is smaller than the Cmax. If it is judged that the osa is smaller than the Cmax, the control routine proceeds to step S12, in which the ECU 13 judges as to whether the temperature of the catalyst 10 or 12 is higher. If it is judged that the temperature of the catalyst 10 and 12 are not higher, the control routine proceeds to step S13, in which the ECU 13 judges as to whether the idle SW 15 is OFF. If it is judged that the idle SW 15 is OFF, the processing in steps S15 to S17 is performed. When the judgment in step S15 is affirmative, the judgment in step S16 is negative and the judgment in step S17 is affirmative, the ECU 13 sets the target air-fuel ratio to 15.0 in step S18. Thereafter, the present control routine is ended.

In contrast, if it is judged in step S13 that the idle SW 15 is not OFF, the control routine proceeds to step S14, in which the ECU 13 sets the target air-fuel ratio to 15.5. In next step S81, the ECU 13 turns on a rich control request flag, which indicates a request for execution of a rich control. In subsequent step S82, the ECU 13 substitutes 0 into an integration Ga counter (Gasum) for integrating the intake air quantity (Ga) in the internal combustion engine 1, and then, initializes the Gasum. Thereafter, the present control routine is ended.

Here, the Ga is integrated in the Gasum according to a calculation routine different from the air-fuel ratio control routine and the oxygen occlusion quantity calculation routine.

If it is judged in step S12 that the temperature of the catalyst is higher, the judgment in step S15 is negative, the judgment in step S16 is affirmative or the judgment in step S17 is negative, the control routine proceeds to step S19, in which the ECU 13 sets the target air-fuel ratio to 14.6. In next step S83, the ECU 13 turns off the rich control request flag. Thereafter, the present control routine is ended.

If it is judged in step S11 that the oxygen occlusion quantity in the three way catalyst 12 is not smaller than the Cmax, that is, the oxygen is occluded in the three way catalyst 12 up to the Cmax, the control routine proceeds to step S84, in which the ECU 13 judges as to whether the rich control request flag is ON. If it is judged that the rich control request flag is not ON, the processings in steps S19 and S83 are performed. Thereafter, the present control routine is ended. In contrast, if it is judged in step S84 that the rich control request flag is ON, the control routine proceeds to step S85, in which the ECU 13 judges as to whether the Gasum is β or less, which is a predetermined integration Ga quantity for determining the completion of the rich control. Incidentally, as β is set the integration Ga quantity, at which the oxygen occlusion quantity in the start catalyst 10 becomes almost the half of the SCmax owing to the execution of the rich control. If it is judged that the Gasum is not β or less, that is, it is judged that the oxygen occlusion quantity in the start catalyst 10 is the half of the SCmax or more, the control routine proceeds to step S86, in which the ECU 13 sets the target air-fuel ratio to 13.5. Thereafter, the present control routine is ended. In contrast, if it is judged that the Gasum is less than β, the control routine proceeds to step S19, in which the ECU 13 sets the target air-fuel ratio to 14.6. In next step S83, the ECU 13 turns off the rich control request flag, and then, ends the present control routine.

In this manner, the oxygen occlusion quantity in the start catalyst 10 can be decreased by performing the rich control after the oxygen is occluded in the three way catalyst 12 up to the Cmax. Consequently, it is possible to reduce the oxidized component such as $NO_x$, which may be emitted during the acceleration in the internal combustion engine 1. The ECU 13 can function as rich control means by executing the processing in steps S85 and S86 in the control routine shown in FIG. 8.

The present invention is not limited to the above-described embodiment, it may be embodied in various modes. For example, an oxygen concentration sensor may be disposed in place of the air-fuel ratio sensor disposed upstream of the start catalyst. Alternatively, an air-fuel ratio sensor may be disposed in place of the oxygen concentration sensor disposed downstream of the start catalyst.

When a purging means for supplying evaporated fuel generated in a fuel tank is connected onto an intake passage of the internal combustion engine 1, the operation of the purging device may be prohibited during the execution of the air-fuel ratio control, such that the evaporated fuel cannot be supplied into the intake passage. In this manner, disturbance of the air-fuel ratio control can be reduced by prohibiting the operation of the purging means.

According to the present invention, it is possible to securely occlude the sufficient quantity of oxygen in the exhaust gas purifying catalyst till the deceleration or stoppage of the internal combustion engine, thereby certainly preventing any generation of the catalyst exhaust gas odor. Furthermore, the first exhaust gas purifying catalyst and the second exhaust gas purifying catalyst are independently made lean state in sequence, thus suppressing the degradation of the operating state or the exhaust emission from the internal combustion engine.

The invention claimed is:

1. An air-fuel ratio control apparatus of an internal combustion engine comprising:
    a first exhaust gas purifying catalyst disposed in an exhaust passage;
    a second exhaust gas purifying catalyst disposed downstream of the first exhaust gas purifying catalyst;
    first air-fuel ratio acquiring means provided upstream of the first exhaust gas purifying catalyst, for acquiring an air-fuel ratio of exhaust gas;
    second air-fuel ratio acquiring means for acquiring an air-fuel ratio of the exhaust gas flowing into the second exhaust gas purifying catalyst; and
    air-fuel ratio controlling means for controlling an air-fuel ratio in the internal combustion engine according to the air-fuel ratio acquired by the first air-fuel ratio acquiring means and the air-fuel ratio acquired by the second air-fuel ratio acquiring means,
    wherein the air-fuel ratio controlling means comprises: lean control means for controlling an air-fuel ratio in the internal combustion engine until the second exhaust gas purifying catalyst becomes lean after completion of a fuel quantity increasing operation of the internal combustion engine; and intermediate lean control means for performing, at least one time, control to change the air-fuel ratio in the internal combustion engine to a lean air-fuel ratio within the range enough to make the first exhaust gas purifying catalyst lean and not enough to make the second exhaust gas purifying catalyst lean between the fuel quantity increasing operation and the air-fuel ratio control by the lean control means, and performs an air-fuel ratio control by the lean control means during an idle operation of the internal combustion engine.

2. The air-fuel ratio control apparatus of the internal combustion engine according to claim 1, wherein the air-fuel ratio controlling means performs an air-fuel ratio control by the intermediate lean control means during a substantially steady operation in a partial load region of the internal combustion engine.

3. The air-fuel ratio control apparatus of the internal combustion engine according to claim 1, wherein the intermediate lean control means makes the air-fuel ratio in the internal combustion engine change to a lean air-fuel ratio by the smaller amount than the lean control means.

4. The air-fuel ratio control apparatus of the internal combustion engine according to claim 1, wherein the air-fuel ratio controlling means does not perform any air-fuel ratio control by the lean control means and the intermediate lean control means when judged that the temperature of the first exhaust gas purifying catalyst or the temperature of the second exhaust gas purifying catalyst is higher than a predetermined temperature at which the degradation of the catalyst is intensified.

5. The air-fuel ratio control apparatus of the internal combustion engine according to claim 1, wherein the air-fuel ratio controlling means comprises a rich control means for performing control to change the air-fuel ratio in the internal combustion engine to a rich air-fuel ratio within the range not enough to make both of the first exhaust gas purifying catalyst and the second exhaust gas purifying catalyst rich after the air-fuel ratio control by the lean control means.

6. The air-fuel ratio control apparatus of the internal combustion engine according to claim 1, further comprising:

learning controlling means for controlling feedback learning relating to the air-fuel ratio in the internal combustion engine; and correcting means for feedback correcting a quantity of fuel to be supplied to the internal combustion engine such that the air-fuel ratio in the internal combustion engine becomes a target air-fuel ratio based on the air-fuel ratio acquired by the second air-fuel ratio acquiring means, wherein the air-fuel ratio controlling means prohibits any operation of the learning controlling means and the correcting means during the air-fuel ratio control by the lean control means and the intermediate lean control means.

7. The air-fuel ratio control apparatus of the internal combustion engine according to claim 1, further comprising: oxygen quantity acquiring means for acquiring a quantity of oxygen occluded in the second exhaust gas purifying catalyst by integrating an excess or shortage amounts of the quantity of oxygen in the exhaust gas calculated based on the air-fuel ratio in the internal combustion engine, both when judged that the air-fuel ratio in the internal combustion engine is lean and the air-fuel ratio acquired by the second air-fuel ratio acquiring means is lean and when judged that the air-fuel ratio in the internal combustion engine is rich and the air-fuel ratio acquired by the second air-fuel ratio acquiring means is rich, wherein the air-fuel ratio controlling means judges as to whether the second exhaust gas purifying catalyst is lean state based on the quantity of oxygen acquired by the oxygen quantity acquiring means.

8. The air-fuel ratio control apparatus of the internal combustion engine according to claim 7, wherein the oxygen quantity acquiring means varies a maximum oxygen occlusion quantity of the second exhaust gas purifying catalyst according to the degradation state of the second exhaust gas purifying catalyst and the temperature of the second exhaust gas purifying catalyst.

* * * * *